United States Patent [19]

Paul

[11] Patent Number: 4,926,762

[45] Date of Patent: May 22, 1990

[54] SECURITY SAFES FOR VEHICLES

[76] Inventor: Clarence A. Paul, P.O. Box 2186, Grass Valley, Calif. 95945

[21] Appl. No.: 419,500

[22] Filed: Oct. 10, 1989

[51] Int. Cl.$^5$ .......................... E05G 1/04; E05G 3/00
[52] U.S. Cl. .................................... 109/51; 109/59 T; 109/23; 70/422
[58] Field of Search ...................... 109/59 R, 59 T, 50, 109/51, 78, 79, 85; 292/352; 70/422

[56] References Cited

U.S. PATENT DOCUMENTS

| | | | |
|---|---|---|---|
| 1,805,759 | 5/1931 | Chamberlain | 109/51 |
| 2,138,856 | 12/1938 | Harp | 70/422 |
| 3,735,714 | 5/1973 | Shoop | 109/59 R |
| 4,123,978 | 11/1978 | Lentini | 109/51 |
| 4,158,337 | 6/1979 | Bahry et al. | 109/59 R |
| 4,348,967 | 9/1982 | Schattner et al. | 109/51 |
| 4,457,240 | 7/1984 | Hungerford . | |
| 4,462,317 | 7/1984 | Franko et al. . | |
| 4,493,268 | 1/1985 | Sidler . | |
| 4,524,904 | 6/1985 | Massé . | |
| 4,534,192 | 8/1985 | Harshgarger et al. | 109/59 R |
| 4,667,491 | 5/1987 | Lokken . | |
| 4,754,715 | 7/1988 | Squires | 109/59 T |

*Primary Examiner*—Neill R. Wilson

[57] ABSTRACT

A relatively lightweight safe is provided in two embodiments with both embodiments being structured using nearly identical principles. The first embodiment is trapezoidal in shape to take advantage of the trapezoidal shaped space behind the hinged, bench-style seats of pickup trucks. The second embodiment is generally rectangular in shape and is adapted to be hidden underneath a removable dining bench-style seat or a bed of a recreational vehicle. The box-like housings of both embodiments are manufactured of a 12 gauge thick steel sheet metal. Around the hinged access door of each embodiment is a framework of steel tubing serving to provide a reinforced location to mount the door hinge and to provide reinforcement around the locked door. Each door and hinge is slightly recessed below the front surface of the steel tubing. Both embodiments use a combination lock mounted on the door for locking a door mounted lock handle assembly stationary. A crank and rod system is attached to the handle assembly in the interior of the door. The crank and rod system is further attached to, and actuates a multiple of lock pins extendable from two oppositely disposed edges of the door. Both embodiments are further lined in the interior with a first layer of mineral fiber heat and fire resistant material, and the mineral fiber is covered with a layer of carpet. The embodiment of the safe are both designed to be securely bolted with carriage bolts to the vehicle to prevent removal therefrom.

20 Claims, 12 Drawing Sheets

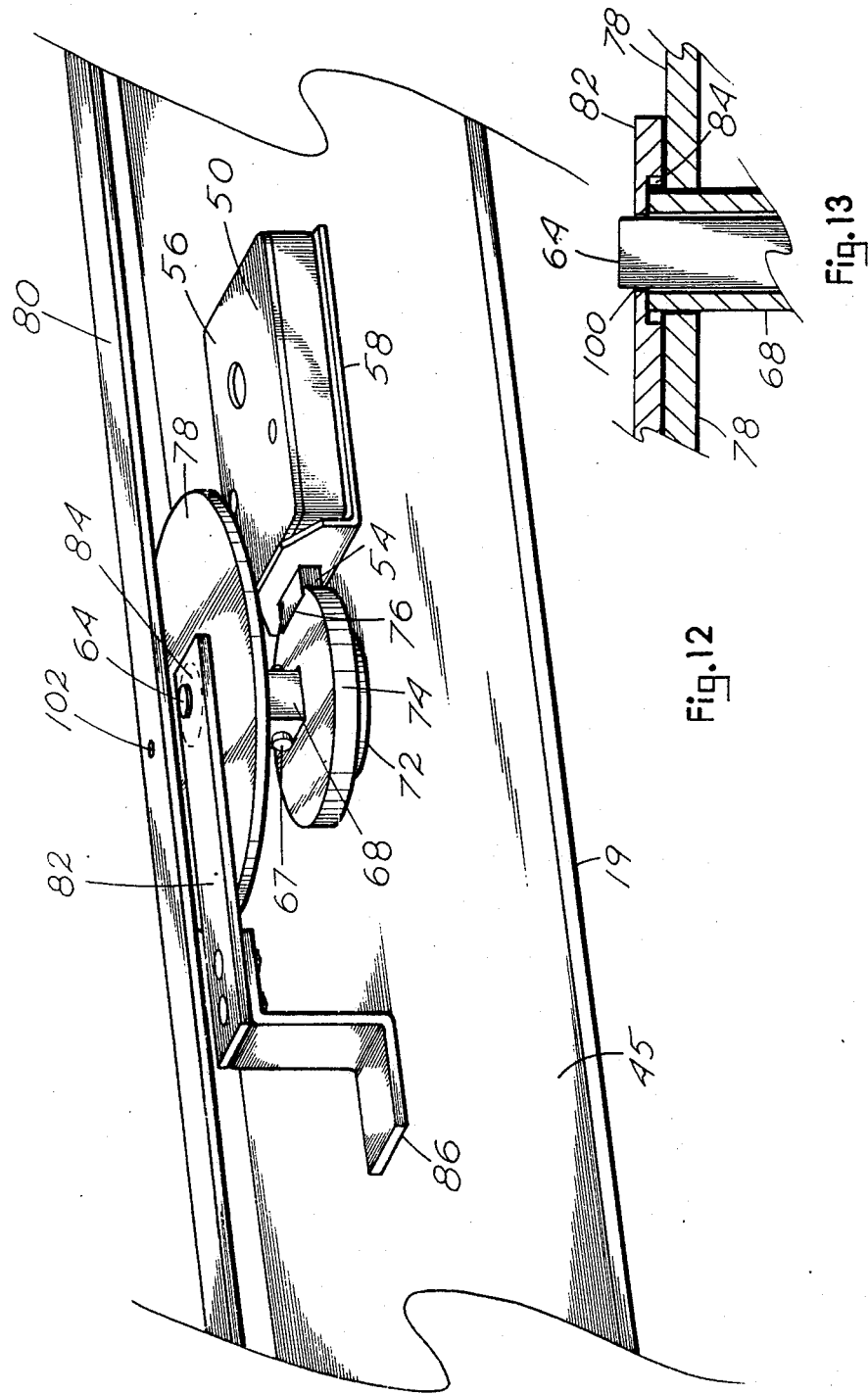

SECURITY SAFES FOR VEHICLES

BACKGROUND OF THE INVENTION

1. Field of the Invention

The present invention relates to strong boxes, lockers and safes particulary for use in vehicles such as recreational vehicles and pickup trucks to secure valuables from theft.

2. Description of the Prior Art

A patent search was conducted at the U.S. Patent and Trademark Office to examine safes adapted for use in vehicles to securely store valuables such as money, guns, jewelry and the like. The search was conducted in the following classes and subclasses: 109/23, 24.1, 44, 45, 50, 63, 70/63.

Of the patents examined, the following were considered pertinent to my invention although not structurally identical: A U.S. patent issued to Franko et al in 1984, patent number 4,462,317 entitled LOCK BOXES. The Franko patent teaches a lock box including a pair of box-like base and cover structures having side and end walls configured to over-lap when the base structure is nestingly received in the cover structure. A key-operated lock is carried on the cover structure and is engageable with a receiving formation provided on the base structure. Interfitting formations are provided on the base and cover structures to assist the key-operated lock in releasably retaining the cover structure in place on the base structure. The base structure has a back wall which may be fastened to a mounting surface.

A U.S. patent issued to Sidler in 1985, patent number 4,493,268 teaches a SAFE KEEPING BOX ASSEMBLY of the portable and carrying type, and of a mounting base, the latter being fastened on a supporting surface such as the wall of a room. The assembly further includes a locking arrangement whereby the safety box may be released from the mounting base to be carried about, the base remaining on the supporting wall.

Lokken et al were issued U.S. Pat. No. 4,667,491 in 1987 for a PORTABLE TRAVEL SAFE that is formed from an outer four-sided hollow tubular elongated structure having a rectangular cross-section with an elongated slot form transverse to the housing and an inner housing having closed end U-shaped members in overlapping leg configuration secured to each other in which one of the legs has a cooperating elongated slot to admit the latch member of a cam lock that is secured to one of the closed ends of the U-shaped members. A tray is provided to secure the valuables within the inner housing and a looped steel cable extends through a pair of slots formed in the edge of one of the closed ends of the U-shaped members.

Hungerford was issued U.S. Pat. No. 4,457,240 in 1984 for a hand held and/or hard mounted travel safe teaching a portable strong weather proof travel safe used by travelers to keep their essential valuables under their personal control enroute to and from a destination and/or while staying there. When not holding the travel safe, they lockably secure it to well anchored strong structures in guest rooms, rental cars, airports, parks, beaches, etc. In one embodiment, a strong cylindrical weatherproof compartment with a full top entry has integral bottom interfitting receiving structure adapted for securement to complementary receiving structures located in traveler facilities, a first rotatable then lift off strong weatherproof cover fully fitting over the full top entry, and locking mechanism to prevent the unwanted first rotation and then lifting off of the strong weatherproof cover, thereby preventing access to the contents and/or to the secured interfitted receiving structures, so they will continue to keep the travel safe well secured to the complementary receiving structure of a travel facility.

Masse el at were issued U.S. Pat. No. 4,524,904 in 1985 for a VAULT. The specification describes a paper-currency vault for use in a vehicle such as a taxi cab for storing paper-currency in excess of a predetermined amount during the normal shift of the taxi cab driver so as to discourage robbery attempts on taxi cab drivers, the vault being formed with a housing adapted to be rigidly secured to a support surface in the vehicle, the housing having a chamber adapted to slidably receive a paper-currency receptacle and a slot opening into the chamber and the receptacle when the receptacle is in a closed position, and a key operated lock for selectively locking the receptacle in its closed position.

There are many varying structures of safes, security lockers and strong boxes described in past art patents and available in the market place. However, I am not aware of any similar devices which include all the combined physical structuring and advantages which allow my security safes to function in an improved manner over the past art for the purpose which they are intended.

SUMMARY OF THE INVENTION

In practicing my invention I have developed a relatively lightweight yet very secure safe for use in vehicles. My security safe is provided in two basic geometric shapes or embodiments with both embodiments being structured using nearly identical principles. Both embodiments are particulary structured to give a high degree of security to valuables stored within, while at the same time being relatively lightweight, preferably under 80 pounds, and secure for the size of the safe. It is important that a safe intended for use in pickup trucks and particulary for use in RVs be lightweight since RV users are generally quite concerned with the amount of weight in their vehicle for reasons such as handling and gas milage. It is of course desirable to have the highest degree of security possible for valuables under all circumstances. Many safes currently on the market are without question very difficult for a thief to rob. However, many of these safes are simply too heavy relative to their size to be of much value in an RV, and are not sized and shaped properly to be of much value for use in a pickup truck cab for larger items such as rifles.

My first embodiment of safe is trapezoidal in shape having a bottom panel parallel with a top panel, a rear panel perpendicular with the bottom panel, and an angled front panel having an access door. This embodiment is primarily structured and shaped for use behind the hinged, bench-style seats of pick-up trucks where a space is normally left unused. The normally available space behind truck bench-style seats which are designed to fold forward, is generally shaped trapezoidal, and my first embodiment is shaped to take full advantage of this space to allow safe storage of items such as hunting rifles. This embodiment in a shorter version is also useful in the exterior storage compartments common to RVs.

My second embodiment of safe is generally rectangular in shape and has a hinged openable door on what is considered the top of the safe. This embodiment is primarily intended for use in the interior of an RV such as a motor home or travel trailer where the safe can be hidden underneath a removable dining bench-style seat or under a bed designed to be raised for easy access to the storage space thereunder. The rectangular safe may also be mounted in the trunk of a car. The rectangular safe of course could actually be mounted anywhere in the vehicle, however greater security can be gained by keeping the safe out of sight.

Both embodiments are desirably manufactured of a 12 gauge thick steel box-like housing with all seams being welded the entire length of the seam. Around the access opening of each embodiment is a framework of rectangular steel tubing serving to provide a strong location to mount the door hinge and also providing a reinforcement around the locked door. The door of each embodiment is attached with a full length piano type hinge. Each door and hinge is slightly recessed inward of the front exposed surface of the reinforcing framework of steel tubing to help prevent thieves from prying on the edges of the door. Both embodiments use a heavy duty commercially available combination lock mounted on the back of the door for locking an accessible door handle and handle rod stationary. A crank and rod system on the backside of the door is attached to the door handle. The crank and rod system is further attached to, and actuates a multiple of lock pins extendable from two opposite side edges of the door into lock pin apertures in the walls of the safe. The multiple lock pins extending from two sides of the door prevent removal of the door even after the hinge has been removed by a thief.

There are significant safety features built into the locking structure of each safe. Should an intruder try to forcibly rotate the handle while the door is in the locked position, a shear pin which attaches the handle to the handle rod will simply break at a predetermined torque based on the carefully selected strength of the shear pin, and the handle will disengage from the handle rod. The release of the handle from the handle rod is to prohibit forced rotation of the additional lock components held stationary by the lock bolt of the combination lock within the door by an unauthorized person. The intruder cannot pull the remaining handle rod from the door due to its connection to a lock retaining tube inside the door by a second larger shear pin. Should the intruder try to rotate the end of the handle rod still projecting from the door, any rotational torque over a designated amount will succeed only in breaking the second shear pin connecting the handle rod with the lock retaining tube. Should this happen, the handle rod could then be withdrawn from the door, but the remaining locking components would still remain in position and locked stationary due to one end of the lock retaining tube being retained within an annular recess of a lock bracket, and the other end being retained by an apertured disk.

Both embodiments are lined in the interior with a first layer of mineral fiber heat and fire resistant material to protect valuables from fire, and the mineral fiber is covered with a layer of carpet to protect valuables from being scratched by moving about within the safe while the vehicle is moving.

The embodiments of the invention are both designed to be securely bolted to the vehicle to prevent removal therefrom. The bolting eliminates the need for building the safes so heavy that they can not be removed by manually lifting. The preferred bolting arrangement is one that uses carriage bolts with the head of the bolts being placed on the outside of the safe on the backside of a floor or wall of the vehicle, and the threaded shanks of the bolts extending through apertures into the safe where the bolts are secured with at least two nuts. The rounded heads of the carriage bolts are ideal for the purpose since they leave nothing for a thief to attach a wrench or screw driver to spin and remove the bolt. Other types of bolts may be used such as one of the many "vandal resistant" bolts commercially available.

Therefore it is a primary object of my invention to provide a security safe for use in a vehicle which is difficult for a thief to enter the safe or remove it for opening later in a safer location.

A further object of my invention is to provide a security safe for use in a vehicle which is difficult for a thief to enter, and which is relatively lightweight, being under 80 lbs. so as not to add an excessive amount of additional weight to the vehicle.

A further object of my invention is to provide a security safe for use in a vehicle which is difficult for a thief to enter, and which provides a measure of protection to valuables stored therein against damage should a fire envelop the safe.

A still further object of my invention is to provide a security safe for use in a vehicle which is difficult for a thief to enter, and which fully utilizes the storage space behind a bench-style seat of a pickup truck.

An even still further object of my invention is to provide a security safe for use in a vehicle which is relatively large and yet very secure relative to the weight of the safe.

Many other structural advantages will be appreciated by those skilled in the art with a reading of the remaining specification and a subsequent comparison of the appended drawings.

BRIEF DESCRIPTION OF THE DRAWINGS

FIG. 12 is an assembled view of the lock components shown in FIG. 11. The lock components are shown in the locked position.

FIG. 13 is an enlarged partial sectional view of the square lock retaining tube with the round handle rod extending through the middle as shown in FIG. 12. The square lock retaining tube is illustrated retained at the upper end by a recess in the Z-shaped bracket shown in FIG. 12.

DESCRIPTION OF THE PREFERRED EMBODIMENTS

Figure 6:
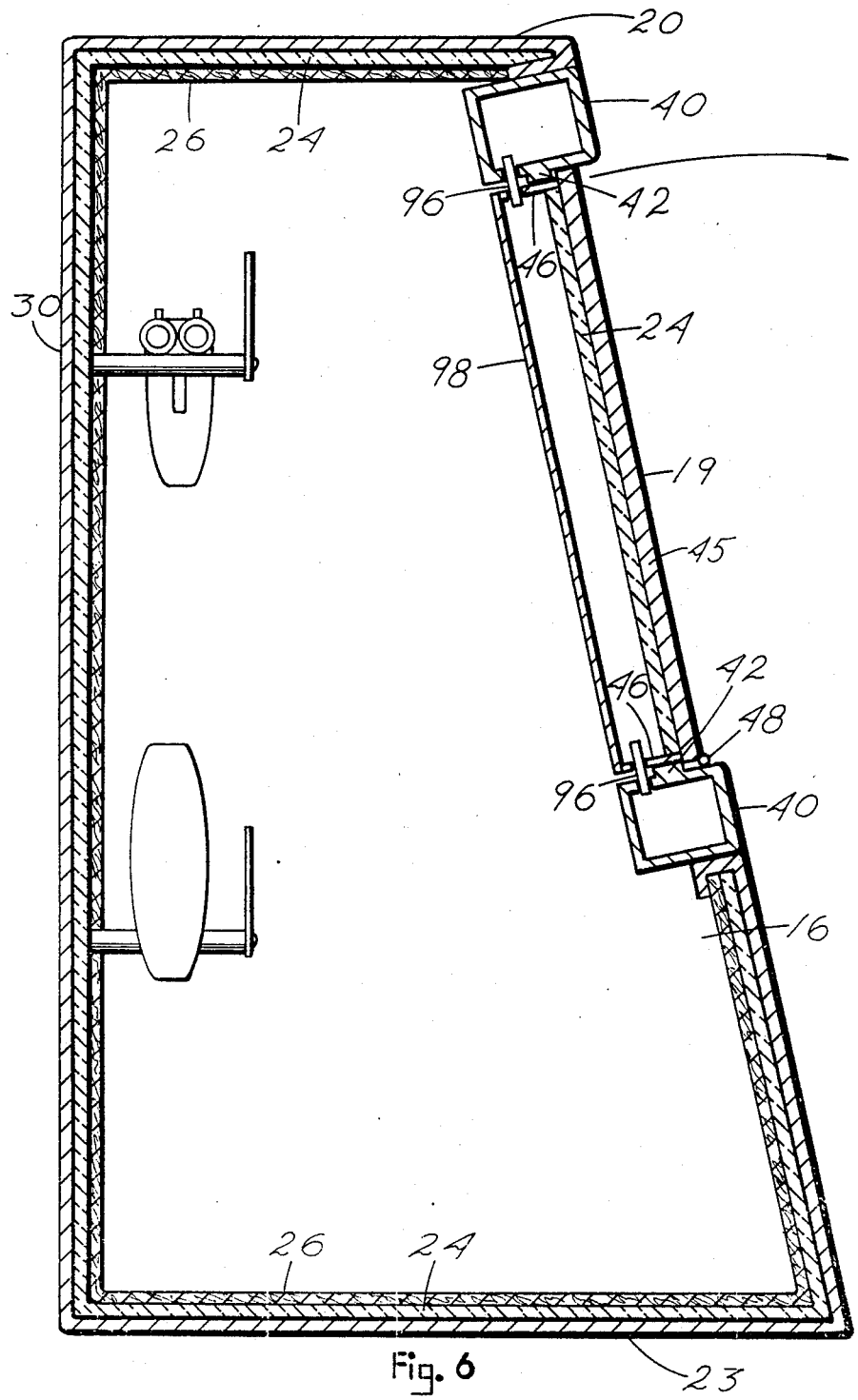
FIG. 6 is a cross-sectional view of the trapezoidal shaped safe having two rifles stored therein. The cross-sectioned door is not illustrated with all the lock components shown in the other drawings due to space limitations.

Referring now to the drawings in general where the trapezoidal shaped safe embodiment of the invention is designated 16, and the rectangular shaped safe embodiment is designated 18. Both embodiments 16 and 18 are structured nearly identical to each other with the exception of the shape of the housings 20 and the placement of door 19 relative to the bottom panel 23. The box-like housings 20 of both embodiments are desirably structured of 12 gauge steel sheet metal formed and welded along the entire length of any and all seams for strength. The welded seams are ground smooth and the housing 20 is painted in order to hide the seams. The hidden seams make it more difficult for a thief to find the seam and to use a hammer and chisel to part or "peel" the welded joints to enter the housing. The interior of each housing 20 is desirably lined with a first layer of heat and fire resistant mineral fiber 24 to help prevent damage to valuables inside should fire envelop the safe. The interior of door 19 is also lined with mineral fiber 24 to complete the heat resistant envelope as shown in FIG. 6. Within housing 20 is a second layer of fabric, desirably carpet 26, adhered with glue or other suitable means to cover the mineral fiber 24 and to help protect valuables within the safe from being scratched, shown in FIG. 6.

Figure 2:
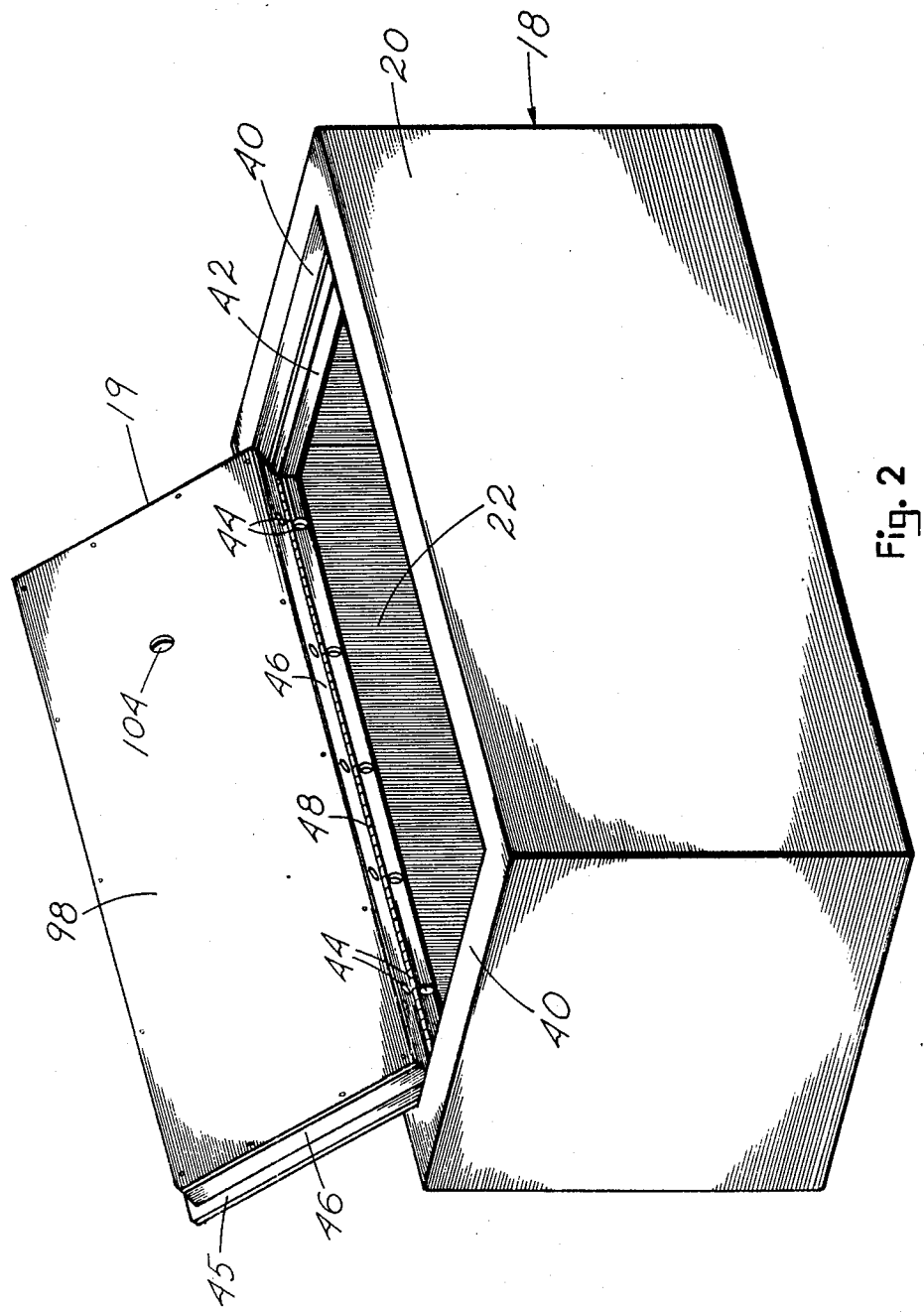
FIG. 2 is a perspective view of the rectangular embodiment of the invention with the safe door in the open position. The rod and crank system contained within the door is covered with a back panel of the door and can not be seen in this view.
Figure 3:
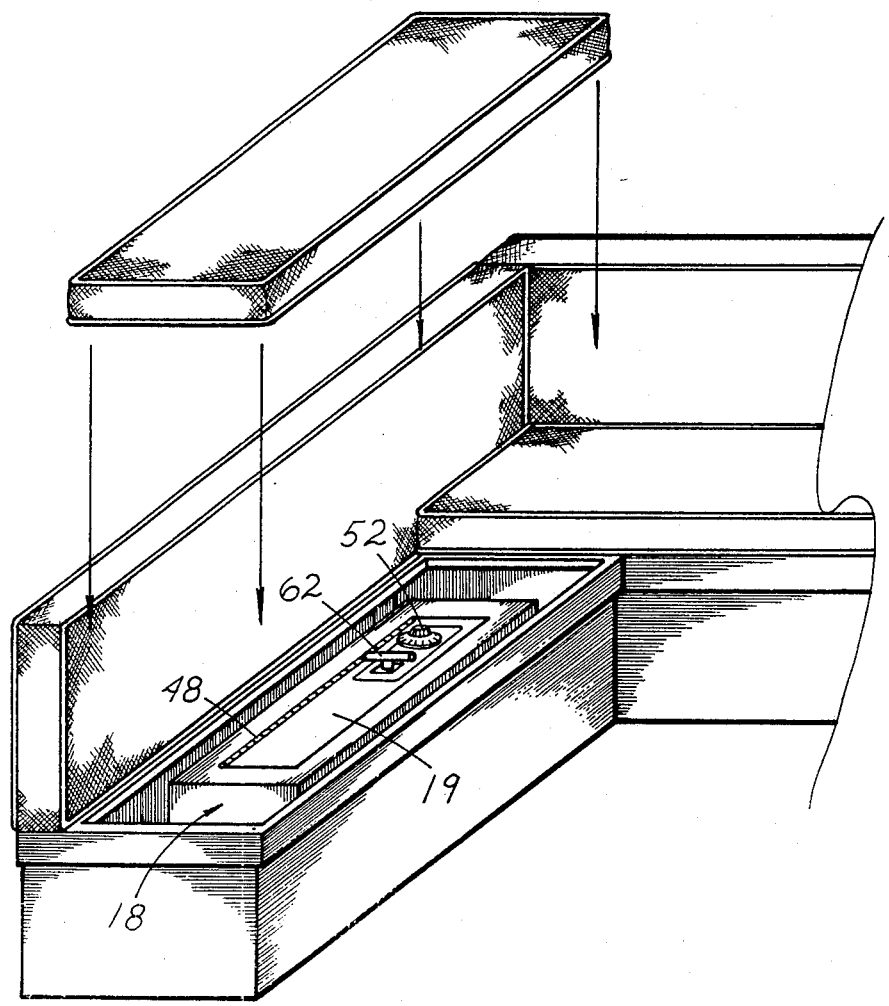
FIG. 3 illustrates the rectangular safe underneath a dining bench-style seat of an RV. The seat is shown removed to allow access to the safe.
Figure 4:
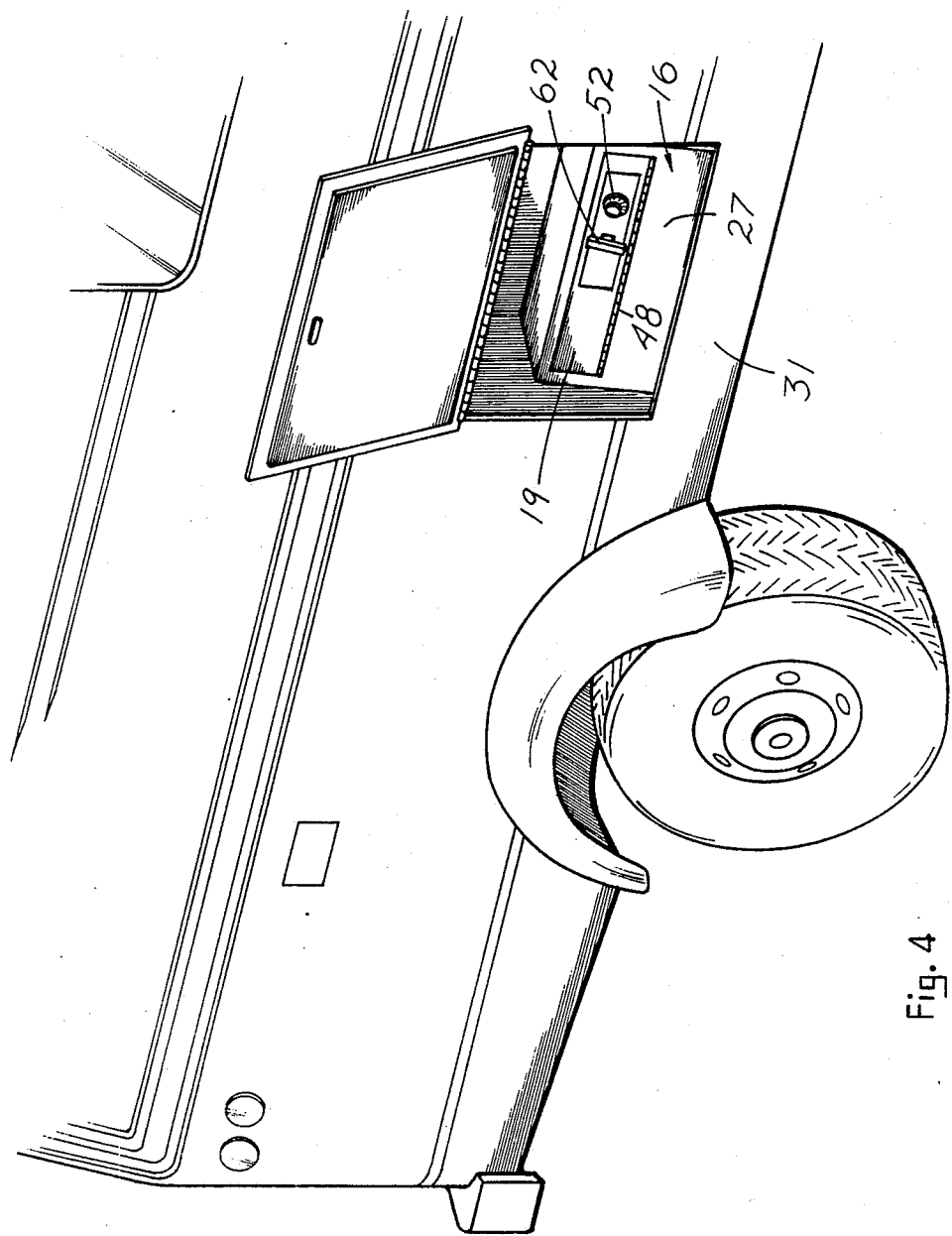
FIG. 4 illustrates a short version of the trapezoidal shaped safe in use in an exterior storage compartment common to RVs. This shape of safe in this particular use allows access to the safe door from the front where there would usually not be sufficient space to access the safe if the door were on the top of the safe as is the case of the rectangular embodiment.
Figure 5:
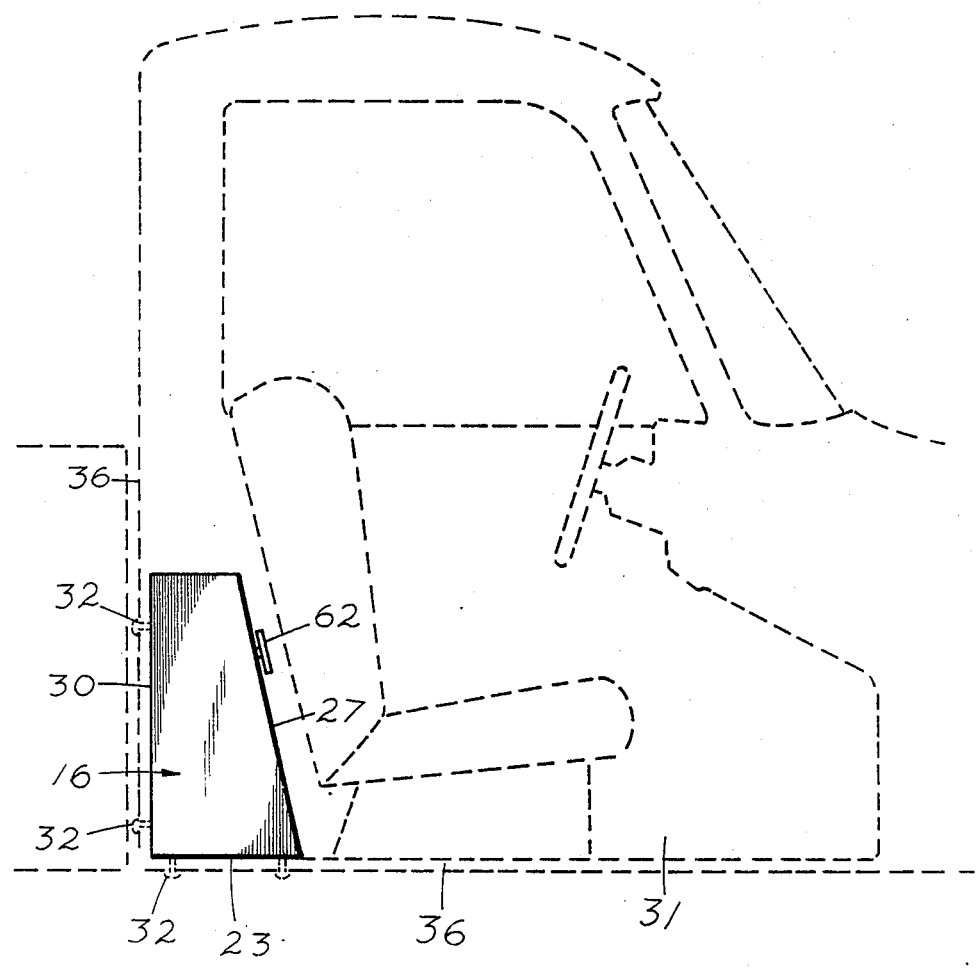
FIG. 5 illustrates the trapezoidal shaped safe in use behind a hinged bench-style seat of a pickup truck. It is normally desirable that the safe in this particular use extend the full length of the cab to allow storage of rifles. It should be noted that this arrangement will also function with hinged bucket seats. The safe is shown bolted to the truck using carriage bolts through both the bottom and rear side panels of the safe.
Figure 7:
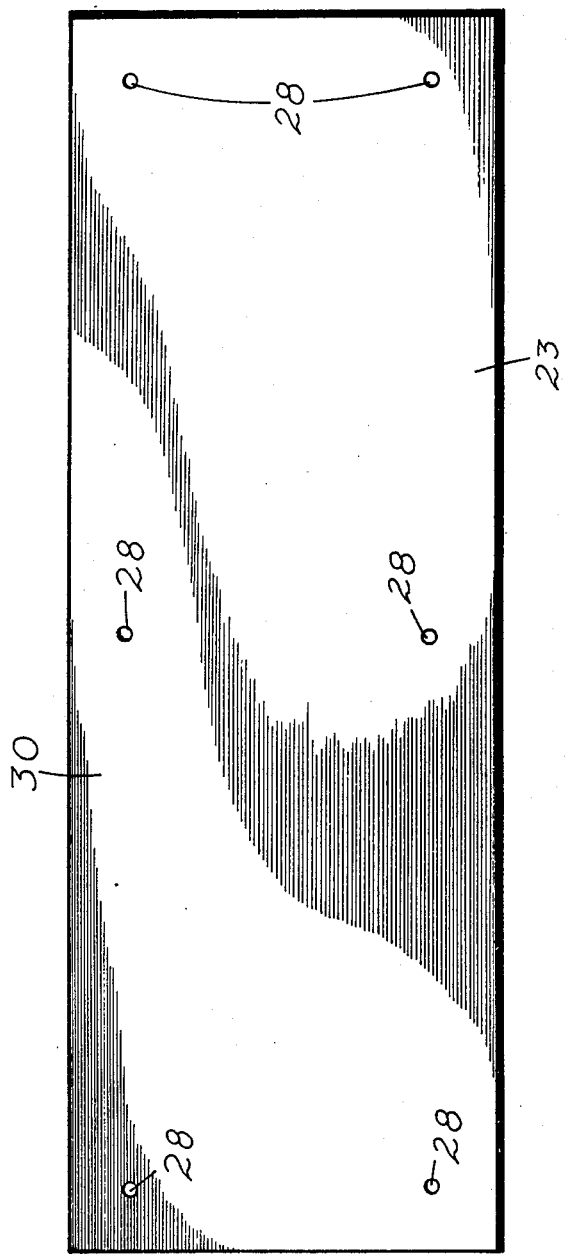
FIG. 7 illustrates either the bottom panel of the rectangular embodiment or the bottom panel or rear side panel of the trapezoidal embodiment. The bolting or attachment apertures to allow fastening of the safe are shown.
Figure 8:
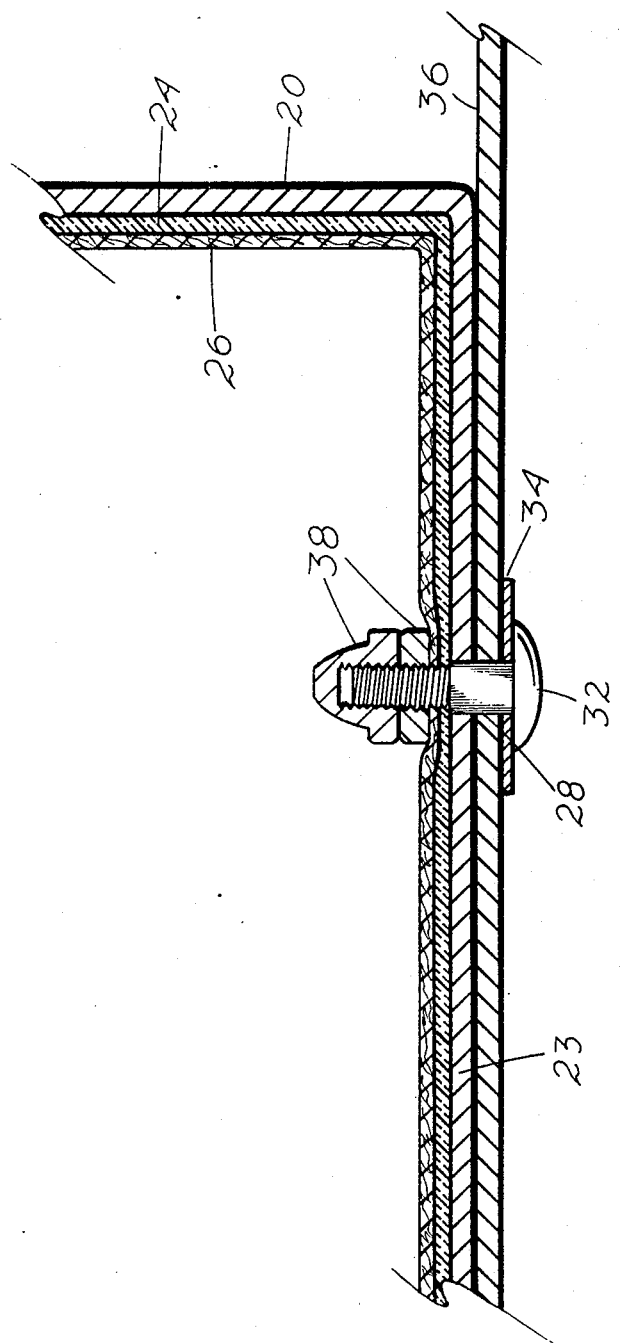
FIG. 8 is a cross-sectional view of one bottom corner of either embodiment of safe showing the construction of the walls of the safe and also illustrating the preferred method of bolting the safes to a stationary member of a vehicle.

As shown in FIG. 7, a plurality of bolt apertures 28 are provided in at least one panel of the housing 20 to allow secure attachment of the safe to a stationary object or surface such as a floor or wall panel 36 in vehicle 31 with a plurality of bolts 32. Rectangular embodiment 18 would normally be provided with apertures 28 only in the bottom panel 23 to allow attachment to vehicle 31 floor with door 19 facing upward or being on the top panel of the safe as shown in FIG. 2 and 3. Trapezoidal embodiment 16 would normally be provided with apertures 28 in both the bottom panel 23 and side panel 30 as shown in FIG. 7 where one panel is illustrative of both panel 23 and 30 since they appear substantially the same. Bolt apertures 28 in two panels allows bolting the safe to two surfaces if desired as shown in FIG. 5, or to just one surface of the vehicle using bolt apertures 28 in bottom panel 23 as would normally be the case for mounting the safe as shown in FIG. 4. FIG. 4 shows a relatively short version of embodiment 16 in an outer storage compartment of a recreational vehicle. Rectangular embodiment 18 may of course also be structured with bolt apertures 28 in two panels for attachment similar to that shown in FIG. 5. Desirably bolt apertures 28 do not extend through mineral fiber 24 and carpet 26 to allow the installer to select which apertures 28 he is going to use for mounting the safe, and then to drill or cut through the soft materials 24 and 26 so as not to leave unsightly holes in the interior of the safe which are not filled with a bolt 32. The bolting eliminates the need for building the safes so heavy that they can not be easily removed by manually lifting. The preferred bolting arrangement is one that uses a plurality of carriage bolts 32 with the domed head of the bolts 32 being placed on the outside of the safe on the backside of a floor or wall of vehicle 31, and the threaded shank of the bolts 32 extending through bolt apertures 28 into the interior of the safe where the bolts 32 are secured with two nuts 38 for added security. The domed or rounded heads of the carriage bolts 32 are ideal for the purpose since they leave nothing for a thief to attach a wrench to spin and remove the bolt. Since the nuts 38 are inside the lockable safe, a thief can not get a wrench on nuts 38 to loosen them. The preferred bolting arrangement is shown in FIG. 8 where a large flat washer 34 has been placed under the head of bolt 32 to make it more difficult for a thief to pry on the safe and to pull the heads of the bolts 32 through the panel 36 of the vehicle 31. The use of two nuts 38 are preferred with the top nut 38 being an acorn style nut to protect the threads of the bolt 32, to further prevent scratching of valuables in the safe, and to prevent the nuts 38 from vibrating loose.

Figure 1:
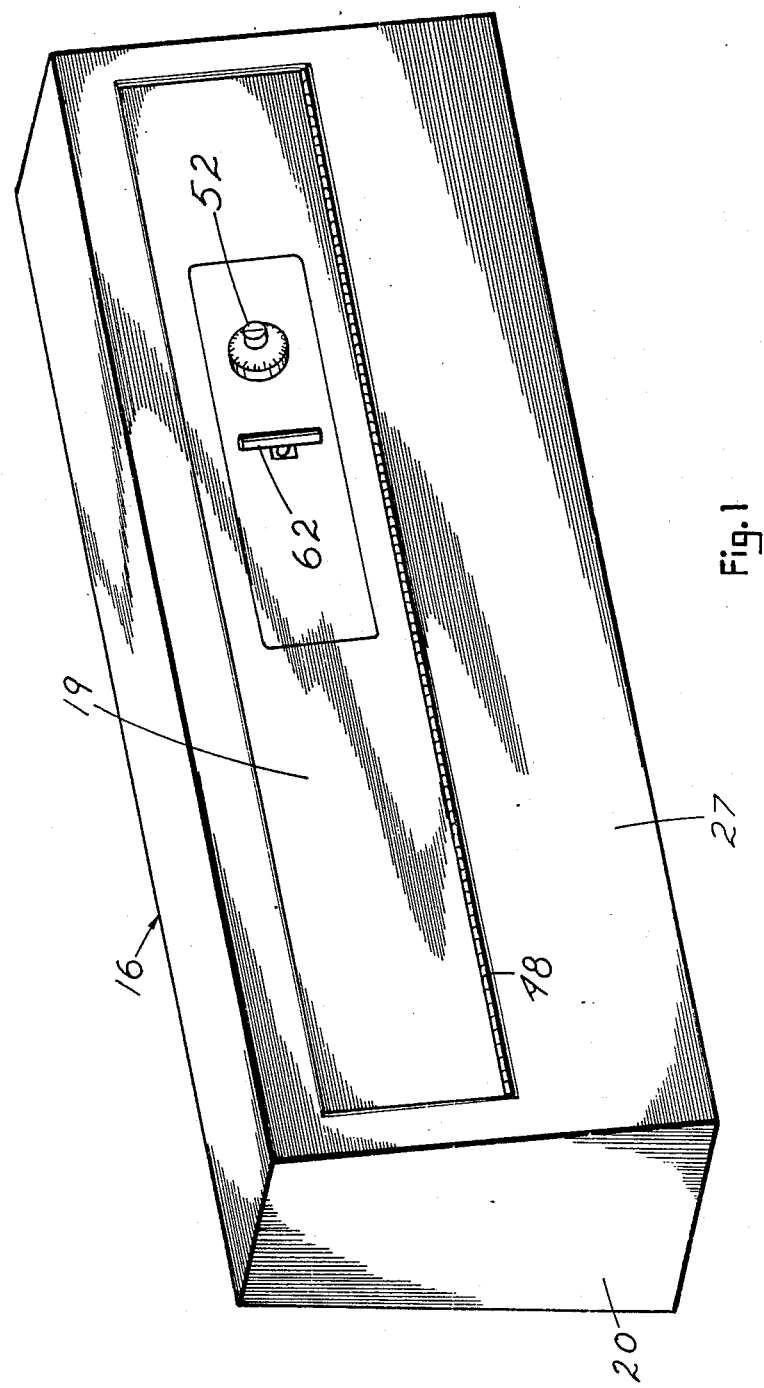
FIG. 1 is a perspective view of the trapezoidal shaped embodiment of the invention.

An access opening 22 is provided in each housing 20. As shown in the cross-section view in FIG. 6 which is generally illustrative of the construction of both embodiments 16 and 18 other than the positioning of the door 19 and the angle of the front panel 27 of embodiment 16 relative to that of embodiment 18, a tubular steel reinforcing framework 40 is welded in place around access opening 22 generally interiorly of housing 20 for additional strength. Door 19 is hingedly affixed to reinforcing framework 40, with door 19 when closed being slightly recessed inward of the front exposed surface of the framework 40 and the housing 20 as shown in FIG. 1 and 6. A narrow strip of steel, designated door stop 42, is welded around the interior surface of reinforcing framework 40 adjacent and behind door 19, preventing door 19 from being forced inward by a thief, see FIG. 2 and 6. Door stop 42 is preferred on several sides of framework 40 but I do not install door stop 42 adjacent hinge 48 mainly due to space limitations caused by the hinge attachment and the closeness of the door 19 to that side. Reinforcing framework 40 contains a plurality of lock pin apertures 44 adjacent door stop 42 further toward the interior of housing 20 than door stop 42. The lock pin apertures 44 of framework 40 are positioned on two oppositely disposed sides of the reinforcing framework 40 adjacent two oppositely disposed sides of door 19 as may be better ascertained from examining drawings FIG. 2 and 6.

Figure 9:
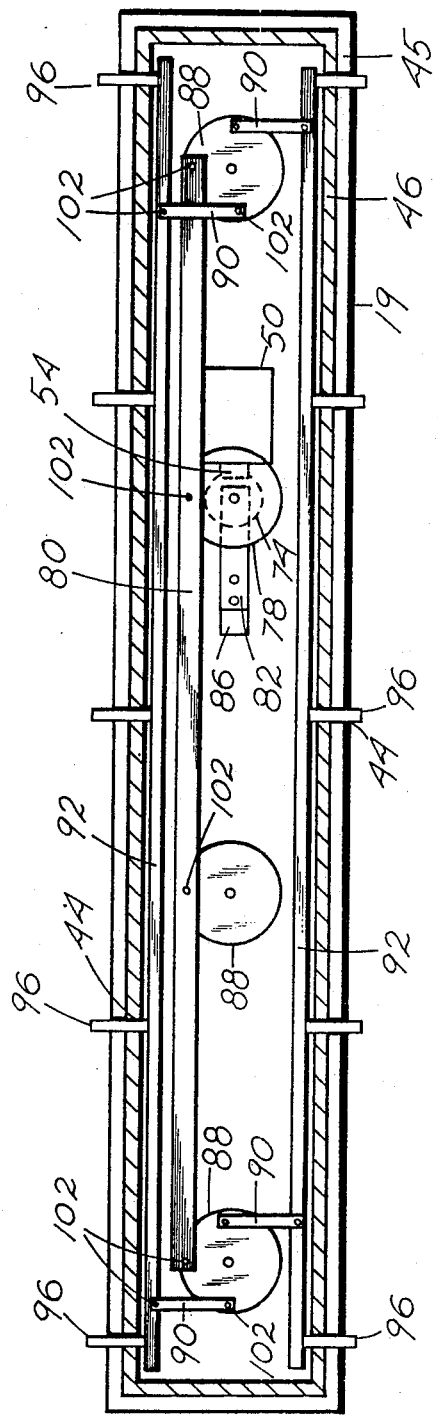
FIG. 9 illustrates a rear view of the door structure common to both embodiments of the safe with the rear panel of the door removed to allow viewing of the combination lock and the crank and rod system. The lock pins are shown extended from two sides of the door illustrating the position of the pins as they would be for a locked safe.

Door 19 is structured of a flat, 3/16' thick rectangular steel door panel 45 which has a steel raised reinforcing frame 46 affixed by welding adjacent the backside outer edges of panel 45 shown best in FIG. 2, 6, and 9. The outer edges of door panel 45 rest against door stops 42, and raised reinforcing frame 46 rests just inward of door stops 42 when the door 19 is closed. Heat and fire mineral fiber 24 is affixed with adhesive or other suitable means directly to the backside of door panel 45 and has small sections removed or apertured to allow attachment of lock components to door panel 45. The raised reinforcing frame 46 serves several purposes such as adding strength to the door 19 and to form a cavity in which to install most of the components of the lock assembly. Raised reinforcing frame 46 also serves as a stabilizer for the distal ends of lock pins 96. Door 19 is affixed on one lengthwise edge with a piano style hinge 48 with the opposite side of hinge 48 being affixed to reinforcing framework 40 adjacent door stop 42 by welding or other suitable means shown best in FIG. 1 and 2.

Figure 11:
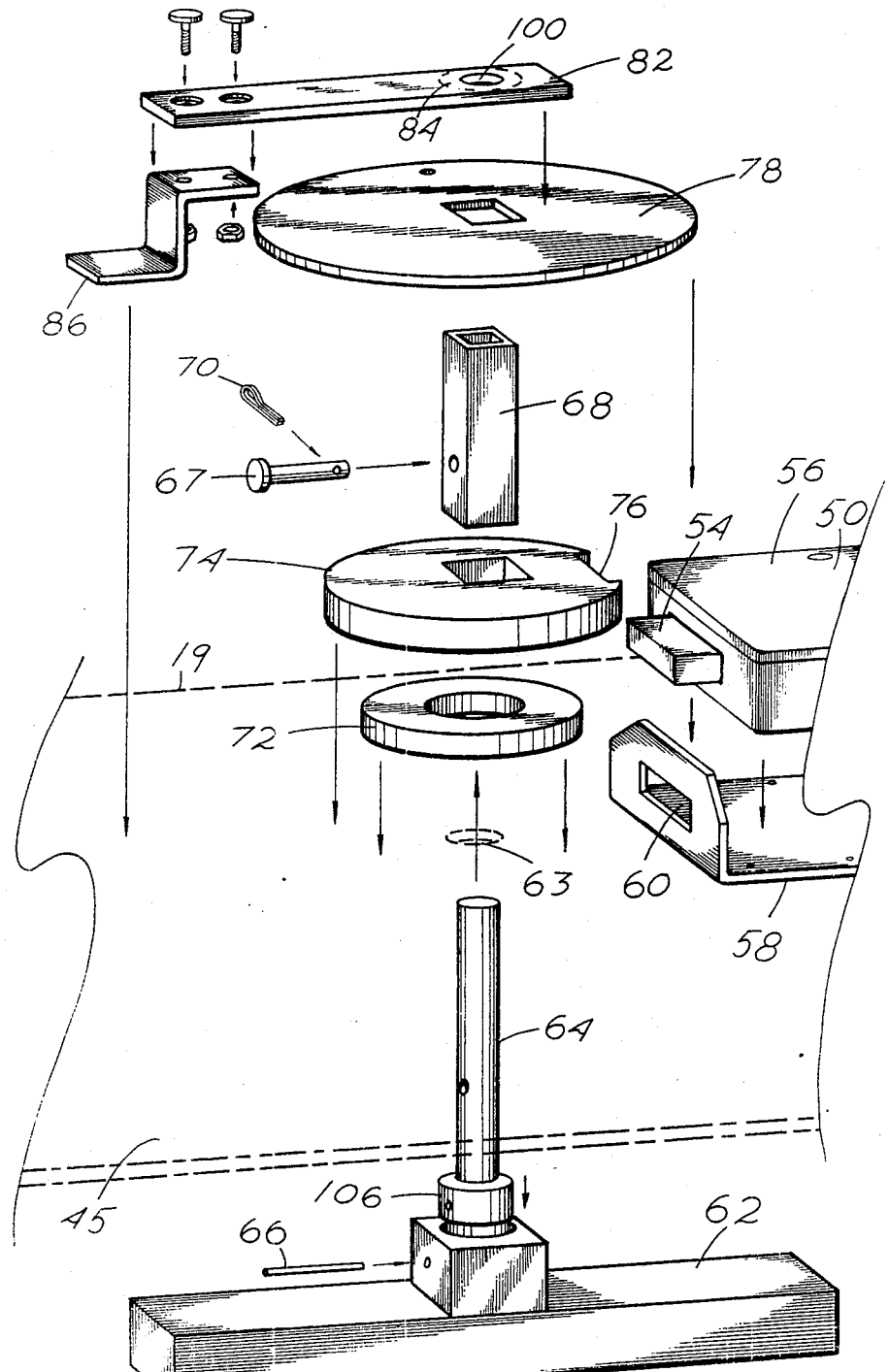
FIG. 11 is an exploded view of the lock components which cooperate with the combination lock, the rod and crank system, and the lock handle. The safe door is shown by way of dotted lines.

Referring now mainly to drawing FIG. 11 and 12 where the structure of door 19 which allows locking of the door over access opening 22 uses a commercially available combination lock 50 affixed to the backside of door panel 45 which is adapted to operate with a rotary dial 52. The rotary dial 52 of combination lock 50 is accessible from the front or exposed side of the door 19 and those skilled in the art will have no problem mounting the lock 50 and dial 52 using known techniques. Combination lock 50 is adapted to extend and retract a rectangular lock bolt 54 from within lock bolt housing 56 by way of proper actuation of rotary dial 52. Lock bolt housing 56 of combination lock 50 is bolted to lock bolt support frame 58. The use of lock bolt support frame 58 is a modification to conventional mounting techniques. Support frame 58 is welded to the backside of door panel 45 and is a rectangular steel plate having a short right angled flanged edge, best seen in FIG. 11. The flanged edge of support frame 58 contains a rectangular lock bolt aperture 60 sized for tight fitting passage of lock bolt 54. Lock bolt support frame 58 serves mainly to further prohibit sideways movement of lock bolt 54 and lock bolt housing 56 during an attempted forced entry of the safe.

A steel tee-shaped handle 62 is accessible for use on the front of door 19. Handle 62 is attached to a steel handle rod 64 which passes through handle rod aperture 63 in door panel 45. Handle rod 64 is adapted to rotate with manual rotation of handle 62. Handle rod 64 is an elongated cylindrical rod having a widened annular tip 106 with tip 106 inserted into a small housing on the underside of handle 62 where it is retained within the housing of handle 62 by a tight fitting shear pin 66 pressed through aligned apertures in the two parts 62 and 64. Handle rod 64 extends at a right angle through handle rod aperture 63 to the backside of door panel 45 where a short section of square tubing designated lock retaining tube 68 is inserted over the end of handle rod 64. Lock retaining tube 68 is secured to handle rod 64 to rotate with the handle rod 64 by a second larger shear pin 67 passed through aligned apertures in rod 64 and tube 68. Shear pin 67 is retained in place by a cotter pin 70. The lower end of lock retaining tube 68 rests against the backside of door panel 45 where it is loosely retained to allow rotation within the central aperture of an apertured disk 72. Apertured disk 72 is welded stationary to the backside of door panel 45 and serves to further prohibit lateral movement to the bottom end of lock retaining tube 68 if handle rod 64 were somehow removed in an attempted forced entry. The opposite end of lock retaining tube 68 will be retained under this situation by lock bracket 82 which will be explained later in the disclosure.

Steel locking plate 74 having a centrally located square aperture is attached to the exterior of lock retaining tube 68 by a tight pressed fit or other suitable means so as not to rotate or slide up and down on lock retaining tube 68. The installed locking plate 74 rests against apertured disk 72 as shown in FIG. 12. Locking plate 74 is positioned adjacent lock bolt 54, with the edge nearest lock bolt 54 containing a rectangular notch sized and shaped for receiving the end of lock bolt 54 when extended. This notch is designated lock bolt stop 76. With lock bolt 54 extended into lock bolt stop 76, handle 62 and all the components attached thereto designed to rotate with handle 62 are locked stationary.

Figure 10:
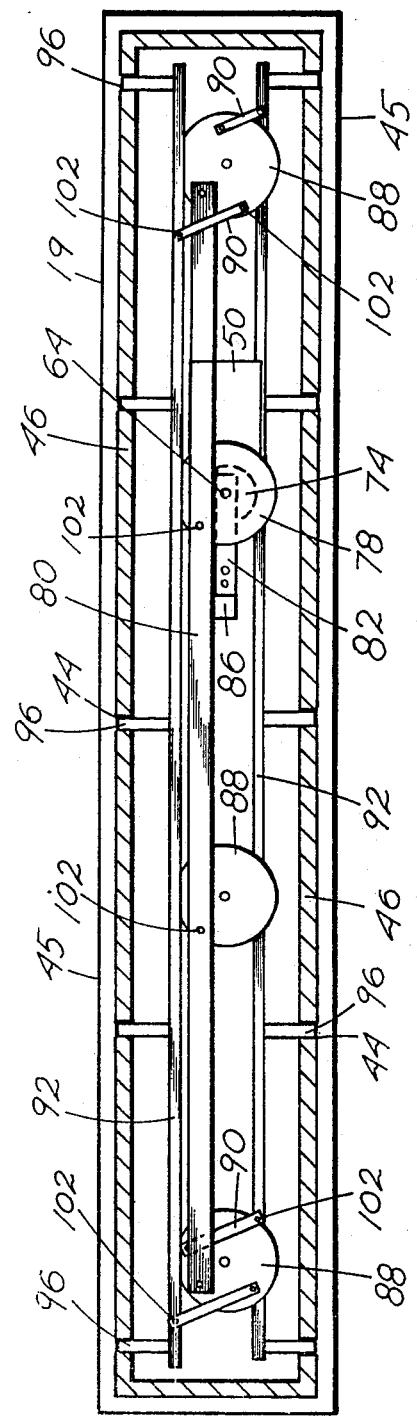
FIG. 10 illustrates a rear view of the door structure common to both embodiments of the safe with the rear cover of the door removed to allow viewing of the lock components. The lock pins are shown retracted illustrating the position of the pins for an unlocked safe.

An annular plate designated main crank 78 also has a central square aperture sized for insertion of lock retaining tube 68. Main crank 78 is positioned over the exterior of lock retaining tube 68 oppositely apertured disk 72 and maintained from moving inward and outward of door panel 45 with a pivotal attachment made by a loose rivet 102 to an elongated rectangular main rod 80 as shown in FIG. 9, 10, and 12. When handle 62 is manually rotated with lock bolt 54 retracted, handle rod 64, lock retaining tube 68, locking plate 74, and main crank 78 also simultaneously rotated.

Handle rod 64, lock retaining tube 68, and main crank 78 are further maintained in position by a removable rectangular steel plate designated lock bracket 82. One end of lock bracket 82 contains an aperture 100 sized for rotatable passage of the end of handle rod 64 therethrough as shown in FIG. 12. The underside surface adjacent main crank 78 of lock bracket 82 also contains an annular recess 84 located around the aperture 100. Annular recess 84 is sized for loose fitting insertion and retention of the end of lock retaining tube 68 in a manner to allow tube 68 to rotate. The oppositely disposed end of lock bracket 82 is releasably attached by bolting to a small Z-bracket 86, shown in FIG. 11 and 12, which is in turn permanently affixed to the backside of door panel 45 by welding. The bolting of lock bracket 82 to Z-bracket 86 allows simple assembly of the lock structure at the factory and allows removal and servicing of the parts if necessary.

As earlier mentioned, main crank 78 is pivotally affixed to main rod 80 which repositions main rod 80 relative to the narrow end of door 19 when handle 62 is rotated. Main rod 80 generally extends from adjacent one end of door panel 45 to the other, parallel to the upper inside lengthwise edge of raised reinforcing frame 46 of door 19. Both terminal ends of main rod 80 are pivotally affixed to, and maintained at the proper elevation by secondary cranks 88 best shown in FIG. 9 and 10. A third secondary crank 88 is also shown pivotally affixed to main rod 80 to the left of main crank 78 and serves mainly as a support means for the long span between main crank 78 and the outer most secondary crank 88. All secondary cranks 88 have supportive stems or stand-offs attached to the backside of door panel 45 which allow rotation of the attached cranks 88 and support the cranks 88 in correct height alignment with main crank 78. Main rod 80 is pivotally attached to main crank 78 and to each of the secondary cranks 88 by a loose rivet 102 off center or to one side of each crank to allow crank action as shown in FIG. 9, 10, 12.

The two outermost secondary cranks 88 adjacent the narrow ends of door 19 are each attached by a loose rivet 102 to one end of two short linkage rods 90 per crank 88. The opposite end of each linkage rod 90 is in turn pivotally affixed with rivets 102 to two elongated rectangular lock pin rods 92 as shown in FIG. 9 and 10 with one linkage rod 90 of each secondary crank 88 attaching to one lock pin rod 92. Lock pin rods 92 are rigid steel rods positioned one on either side of secondary cranks 88 and parallel to main rod 80 and raised reinforcing frame 46. Lock pin rods 92 extend generally along the full lengthwise edge of door 19 within raised reinforcing frame 46. A second plurality of lock pin apertures 44 are located through the two oppositely disposed lengthwise side edges of raised reinforcing frame 46 adjacent lock pin rods 92. Lock pin apertures 44 of reinforcing frame 46 are aligned and sized for passage of lock pins 96 attached to lock pin rods 92. Lock pins 96 are small cylindrical steel rods affixed on the outer lengthwise edges of both lock pin rods 92. Lock pins 96 are desirably always at least partially inserted into and supported by the lock pin apertures 44 of raised reinforcing frame 46 as shown in FIG. 9 and 10.

Rotation of handle 62 causes main crank 78 to rotate which in turn moves main rod 80 either inward or outward of the center of door panel 45, and toward and away from one or the other narrow end of the door 19 depending on the direction of rotation of handle 62. This is due to the off center attachment of the rod 80 to crank 78. Movement of main rod 80 in turn causes secondary cranks 88 to rotate whereby linkage rods 90 are moved. With movement of linkage rods 90, both lock pin rods 92 either draw inward or move toward the edges of raised reinforcing frame 46 depending on the direction of the rotation of handle 62. This is due to the off center attachment of linkage rods 90 to the secondary cranks as shown in FIG. 9. The lock pin apertures 44 on raised reinforcing frame 46 of door 19 and the lock pin apertures 44 of reinforcing framework 40 of access opening 22 are aligned when door 19 is in the closed position, also seen in FIG. 6. As lock pin rods 92 are repositioned, lock pins 96 are either inserted into or withdrawn from the lock pin apertures 44 of reinforcing framework 40. Counterclockwise rotation of handle 62 with door 19 closed will move lock pins 96 through both sets of lock pin apertures 44 to secure the door 19 closed. The extension of lock bolt 54 into aligned lock bolt stop 76 with the lock pins 96 extended through both sets of lock pin apertures 44 by rotation of rotary dial 52 will lock the door 19 closed against those who do not know the combination of lock 50.

A cover plate 98 is attached to the edges of raised reinforcing frame 46 with rivets to cover and prevent snagging of the safe contents during insertion and removal. An aperture 104 is located through cover plate 98 directly over lock bolt housing 56 which is used to access an aperture in the surface of lock bolt housing 56 for the purposes of altering the combination.

To gain access to the interior of housing 20 when door 19 is locked over the access opening 22, the user rotates rotary dial 52, located on the exterior of door 19, using the correct manipulation of combination numbers to result in the retraction of lock bolt 54 into lock bolt housing 56. Handle 62 can then be rotated which effects the simultaneous retraction of all locking pins 96 from lock pin apertures 44 of raised reinforcing frame 46. Door 19 can then be opened. The recessing of door 19 into access opening 22 allows the lower edge of reinforcing framework 40 to serve as a support for door 19, preventing door 19 from falling flush against the exterior of housing 20 when opened.

There are significant safety features built into my locking structure. Shear pin 66 is selected to break prior to shear pin 67. Should an intruder try to forcibly rotate handle 62 while door 19 is in the locked position, shear pin 66 will simply break at a designated torque, and handle 62 will disengage from handle rod 64. The release of handle 62 from handle rod 64 is to prohibit forced rotation of the additional lock components within door 19 by an unauthorized person. The intruder cannot pull the remaining handle rod 64 from handle rod aperture 63 due to its connection to lock retaining tube 68 by the second larger shear pin 67. Nor can handle rod 64 be forced through handle rod aperture 63 due to the widened annular end 106 which is larger than handle rod aperture 63, best seen in FIG. 11. Should the intruder be able to somehow attach a levering device to the round, smooth tip 106 of handle rod 64 after handle 62 has been disconnected and rotate the rod 64, any rotational torque over a designated amount will succeed only in breaking the second shear pin 67 connecting handle rod 64 with lock retaining tube 68. Should this happen, handle rod 64 could then be withdrawn from handle rod aperture 63, but the remaining locking components, lock retaining tube 68, locking plate 74 and main crank 78 would still remain in position and locked stationary due to one end of lock retaining tube 68 being retained within annular recess 84 of lock bracket 82 and the other end being retained by apertured disk 72.

Should a thief somehow remove the hinge 48 for the locked safe, the lock pins 96 extending from two oppositely disposed sides of the door 19 would maintain the door positioned over the access opening 22. The commercially available heavy duty combination lock 50 used with my safes is specifically structured to very resistant to thieves removing rotary dial 52 and "punching" the components of lock 50 to attempt to defeat the lock structure in that manner. The 12 gauge steel housing 20 although not totally secure against cutting torches and power metal chisels, is adequate against attempted forced entries by the vast majority of thieves since it would take quite a bit of time and make too much noise to enter the safe through the walls of housing 20. Time is usually of the essence in a burglary. Since these safes cannot be easily removed from the vehicle 31, most potential thieves generally would not risk the time required to defeat the bolting system.

Thus having described and shown my invention by way of example in the drawings and in the specification adequately to allow those skilled in the art to both build and use my invention, it is realized modifications in my invention by those skilled in the art will be possible. Therefore, I will consider any modifications made which fall within the intended scope and spirit of the appended claims as my invention.

What I claim as my invention is:

1. A safe for use in a vehicle to secure valuables, comprising:

a metal box-like housing having an interior first layer of heat and fire resistant material placed against said metal; an interior second layer of a fabric carpet-like material over said heat and fire resistant material; a plurality of apertures in at least one panel of said housing adapted to allow attachment of said housing to a stationary member of said vehicle with a plurality of fasteners; said fasteners being of a type to provide nonremovability of said fasteners with said safe in a closed and locked position; an access opening in said housing; a metal reinforcing framework generally interiorly of said housing around said access opening; an openable door structured of a metal panel having a raised reinforcing frame adjacent outside edges of a backside of said door, said door attached by a hinge to said reinforcing framework of said housing with said hinged door adapted to close said access opening; said hinged door recessed inward of an exposed front edge of said reinforcing framework around said access opening;

a locking means adapted to secure said door over said access opening comprising a combination lock affixed to said backside of said door, said combination lock having a rotary dial accessible on a front side of said door, said combination lock adapted to extend and retract a lock bolt of said combination lock on said backside of said door by way or proper actuation of said rotary dial; a handle rod extending through an aperture in said door generally adjacent said combination lock, a handle attached to one end of said handle rod on said front side of said door adapted to rotate said handle rod with rotation of said handle; a locking plate attached by releasable attachment means to said handle rod on said backside of said door with said locking plate adapted to allow locking said handle rod stationary against an extended said lock bolt of said combination lock; said handle attached to said handle rod by an attachment means adapted to release said handle from said handle rod at a predetermined torque when said handle rod is locked stationary; a main crank connected by attachment means to said handle rod on said backside of said door with said main crank adapted to move with rotation of said handle rod; a main rod attached to said main crank adapted to move with movement of said main crank; said main rod being further attached to at least one secondary crank; said secondary crank rotatably attached to said backside of said door; a plurality of lock pin apertures extending through said raised reinforcing frame in at least two oppositely disposed side edges of said door; a plurality of lock pin apertures in said reinforcing framework around said access opening aligned with said lock pin apertures in said raised reinforcing frame of said door with said door in said closed position; two lock pin rods, one said lock pin rod extending generally parallel along each said oppositely disposed side edge of said door adjacent said reinforcing frame having said lock pin apertures; a plurality of lock pins attached to each said lock pin rod with one said lock pin aligned with each said lock pin aperture in said raised reinforcing frame; a linkage means attached to each said lock pin rod and said secondary crank; said locking means adapted to allow said handle to be manually rotated with said lock bolt retracted whereby said rotation of said handle causes said handle rod and said attached main crank to rotate causing said main rod to move whereby said secondary crank is rotated causing movement of said linkage means; said movement of said linkage means causing both said lock pin rods to move outward extending said lock pins through said lock pin apertures in both said reinforcing frame and said reinforcing framework to lock said safe closed with said rotation of said handle in one direction, said handle rotated in an opposite direction causing retraction of both said lock pin rods and said lock pins to allow opening of said door;

said releasable attachment means attaching said locking plate to said handle rod structured to maintain said locking plate in place and said door in said locked position with said handle and said handle rod removed from said safe.

2. The safe as described in claim 1 wherein said box-like housing is trapezoidal in shape and said access opening is in an angled panel of said trapezoidal shaped housing.

3. The safe as described in claim 2 wherein said trapezoidal shape generally corresponds to a trapezoidal shaped storage space behind seats in a pickup truck.

4. The safe as described in claim 1 wherein said box-like housing is generally rectangular in shape.

5. The safe as described in claim 1 wherein said fasteners are carriage bolts.

6. The safe as described in claim 1 wherein said metal is steel.

7. A safe for use in a vehicle to secure valuables, comprising:

a metal box-like housing; a plurality of apertures in at least one panel of said housing adapted to allow attachment of said housing to a stationary member of said vehicle with a plurality of fasteners; an access opening in said housing; a metal reinforcing framework generally interiorly of said housing around said access opening; an openable door structured of a metal panel having a raised reinforcing frame adjacent outside edges of a backside of said door, said door attached by a hinge to said reinforcing framework of said housing with said hinged door adapted to close said access opening;

a locking means adapted to secure said door over said access opening providing a closed position of said safe, said locking means comprising a combination lock affixed to said backside of said door, said combination lock having a rotary dial accessible on a front side of said door, said combination lock adapted to extend and retract a lock bolt of said combination lock on said backside of said door by way of proper actuation of said rotary dial; a handle rod extending through an aperture in said door generally adjacent said combination lock, a handle attached to one end of said handle rod on said front side of said door adapted to rotate said handle rod with rotation of said handle; a locking plate attached by releasable attachment means to said handle rod on said backside of said door with said locking plate adapted to allow locking said handle rod stationary against an extended said lock bolt of said combination lock; said handle attached to said handle rod by an attachment means adapted to release said handle from said handle rod at a predetermined torque when said handle rod is locked stationary; a main crank connected by attachment means to said handle rod on said backside of said door with said main crank adapted to move with rotation of said handle rod; a main rod attached to said main crank adapted to move with movement of said main crank; said main rod being further attached to at least one secondary crank; said secondary crank rotatably attached to said backside of said door; a plurality of lock pin apertures extending through said raised reinforcing frame in at least two oppositely disposed side edges of said door; a plurality of lock pin apertures in said reinforcing framework around said access opening aligned with said lock pin apertures in said raised reinforcing frame of said door with said door in a closed position; two lock pin rods, one said lock pin rod extending generally parallel along each said oppositely disposed side edge of said door adjacent said reinforcing frame having said lock pin apertures; a plurality of lock pins attached to each said lock pin rod with one said lock pin aligned with each said lock pin aperture in said raised reinforcing frame; a linkage means attached to each said lock pin rod and said secondary crank; said locking means adapted to allow said handle to be manually rotated with said lock bolt retracted whereby said rotation of said handle causes said handle rod and said attached main crank to rotate causing said main rod to move whereby said secondary crank is rotated causing movement of said linkage means; said movement of said linkage means causing both said lock pin rods to move outward extending said lock pins through said lock pin apertures in both said reinforcing frame and said reinforcing framework to lock said safe closed with said rotation of said handle in one direction, said handle rotated in an opposite direction causing retraction of both said lock pin rods and lock pins to allow opening of said door;

said releasable attachment means attaching said locking plate to said handle rod structured to maintain said locking plate in place and said door in said locked position with said handle and said handle rod removed from said safe.

8. The safe as described in claim 7 wherein said box-like housing is trapezoidal in shape and said access opening is in an angled panel of said trapezoidal shaped housing.

9. The safe as described in claim 8 wherein said trapezoidal shape generally corresponds to a trapezoidal shaped storage space behind seats in a pickup truck.

10. The safe as described in claim 7 wherein said box-like housing is generally rectangular in shape.

11. The safe as described in claim 7 wherein said door and said hinge are recessed below an exposed edge of said reinforcing framework around said access opening.

12. The safe as described in claim 7 wherein said metal is steel.

13. A safe for use in a vehicle to secure valuables, comprising:

a metal box-like housing; a plurality of apertures in at least one panel of said housing adapted to allow attachment of said housing to a stationary member of said vehicle with a plurality of fasteners; an access opening in said housing; an openable door structured of a metal panel having a raised frame adjacent outside edges of a backside of said door, said door attached by a hinge to said housing with said hinged door adapted to close said access opening;

a locking means adapted to secure said door over said access opening providing a closed position of said safe, said locking means comprising a combination lock affixed to said backside of said door, said combination lock having a rotary dial accessible on a front side of said door, said combination lock adapted to extend and retract a lock bolt of said combination lock on said backside of said door by way of proper actuation of said rotary dial; a handle rod extending through an aperture in said door generally adjacent said combination lock, a handle attached to one end of said handle rod on said front side of said door adapted to rotate said handle rod with rotation of said handle; a locking plate attached to said handle rod on said backside of said door with said locking plate adapted to allow locking said handle rod stationary against an extended said lock bolt of said combination lock; said handle attached to said handle rod by an attachment means adapted to release said handle from said handle rod at a predetermined torque when said handle rod is locked stationary; a main crank connected by attachment means to said handle rod on said backside of said door with said main crank adapted to move with rotation of said handle rod; a main rod attached to said main crank adapted to move with movement of said main crank; said main rod being further attached to at least one secondary crank; said secondary crank rotatably attached to said backside of said door; a plurality of lock pin apertures extending through said raised frame in at least two oppositely disposed side edges of said door; a plurality of lock pin apertures in said housing aligned with said lock pin apertures in said raised frame of said door with said door in said closed position; two lock pin rods, one said lock pin rod extending generally parallel along each said oppositely disposed side edge of said door adjacent said raised frame having said lock pin apertures; a plurality of lock pins attached to each said lock pin rod with one said lock pin aligned with each said lock pin aperture in said raised frame; a linkage means attached to each said lock pin rod and said secondary crank;

said locking means adapted to allow said handle to be manually rotated with said lock bolt retracted whereby said rotation of said handle causes said handle rod and said attached main crank to rotate causing said main rod to move whereby said secondary crank is rotated causing movement of said linkage means; said movement of said linkage means causing both said lock pin rods to move outward extending said lock pins through said lock pin apertures in both said raised frame and said housing to lock said safe closed with said rotation of said handle in one direction, said handle rotated in an opposite direction causing retraction of both said lock pin rods and lock pins to allow opening of said door.

14. The safe as described in claim 13 wherein said box-like housing is trapezoidal in shape and said access opening is in an angled panel of said trapezoidal shaped housing.

15. The safe as described in claim 14 wherein said trapezoidal shape generally corresponds to a trapezoidal shaped storage space behind seats in a pickup truck.

16. The safe as described in claim 13 wherein said box-like housing is generally rectangular in shape.

17. A safe for use in a vehicle to secure valuables, comprising:
- a metal box-like housing; means of attaching said housing to a stationary member of said vehicle; an access opening in said housing; an openable door attached by a hinge to said housing with said hinged door adapted to close said access opening;
- a locking means adapted to secure said door over said access opening; said locking means comprising a lock affixed to a backside of said door, said lock having a lock actuation means accessible on a front side of said door, said lock adapted to extend and retract a lock bolt of said lock on said backside of said door by way of proper actuation of said lock actuation means; a handle rod extending through an aperture in said door generally adjacent said lock, a handle attached to one end of said handle rod on said front side of said door adapted to rotate said handle rod with rotation of said handle; a locking plate attached to said handle rod on said backside of said door with said locking plate adapted to allow locking said handle rod stationary against an extended said lock bolt of said lock; said handle attached to said handle rod by an attachment means adapted to release said handle from said handle rod at a predetermined torque when said handle rod is locked stationary; a crank and rod system connected by attachment means to said handle rod on said backside of said door adapted to cause a plurality of lock pins to extend from said door into lock pin apertures in said housing upon rotation of said handle rod by way of manual rotation of said handle with said door in a closed position.

18. The safe as described in claim 17 wherein said box-like housing is trapezoidal in shape and said access opening is in an angled panel of said trapezoidal shaped housing.

19. The safe as described in claim 18 wherein said trapezoidal shape generally corresponds to a trapezoidal shaped storage space behind seats in a pickup truck.

20. The safe as described in claim 17 wherein said box-like housing is generally rectangular in shape.

* * * * *